United States Patent [19]

Wood et al.

[11] 4,246,146

[45] Jan. 20, 1981

[54] FIRE RETARDANT COATING SYSTEM UTILIZING POLYURETHANE HYDROGEL

[75] Inventors: Louis L. Wood, Rockville; Glenn E. Fulmer, Clarksville, both of Md.

[73] Assignee: W. R. Grace & Co., New York, N.Y.

[21] Appl. No.: 18,974

[22] Filed: Mar. 9, 1979

[51] Int. Cl.³ .......................... C08L 1/02; C08L 75/08
[52] U.S. Cl. .................. 260/9; 260/29.2 TN; 260/DIG. 24
[58] Field of Search ............... 260/29.2 TN, DIG. 24, 260/9, 45.7 R, 45.7 PH, 45.7 RT, 45.75 R; 528/45, 59

[56] References Cited

U.S. PATENT DOCUMENTS

| | | | |
|---|---|---|---|
| 2,948,691 | 8/1960 | Windemuth et al. | 260/2.5 |
| 3,719,050 | 3/1973 | Asao et al. | 61/36 R |
| 3,897,372 | 7/1975 | Kehr | 260/2.5 AJ |
| 4,066,578 | 1/1978 | Murch et al. | 521/123 |
| 4,118,354 | 10/1978 | Harada et al. | 260/29.2 TN |

FOREIGN PATENT DOCUMENTS 1478000  6/1977  United Kingdom .

*Primary Examiner*—Theodore E. Pertilla
*Attorney, Agent, or Firm*—Edward J. Cabic

[57] ABSTRACT

A fire-retardant protective coating is produced by dissolving a water-soluble polyisocyanate prepolymer in either an aqueous slurry or solution of fire-retardant materials and/or intumescent materials. After mixing, the gel produced can be applied as a coating which is useful for protecting or holding together surfaces vulnerable to fire, heat, air or minor abrasion. After the water evaporates, the cross-linked polyurethane coating has a large solids content of the fire-retardant and/or intumescent materials uniformly dispersed throughout. Preferred prepolymers are liquid with a molecular weight greater than about 2,000 and are made of a random copolymer of ethylene oxide and other alkylene oxides with isocyanate capping.

36 Claims, No Drawings

FIRE RETARDANT COATING SYSTEM UTILIZING POLYURETHANE HYDROGEL

BACKGROUND OF THE INVENTION

1. Field of the Invention

The present invention relates to a fire-retardant, elastomeric polyurethane gel composition and a process for making this consumption. The invention also relates to protecting surfaces by applying to them a mixture of these gel-forming reactants.

2. Description of the Prior Art

Polyurethane gel production is known. The Windemuth et al U.S. Pat. No. 2,948,691 discloses that isocyanate modified polyglycolethers, especially those having a molecular weight higher than 2,000, are soluble in water. These polymers are prepared by reacting polyglycolethers having at least two terminal hydroxyl groups with either mono- or polyfunctional aliphatic or aromatic isocyanates. Aqueous solutions prepared with these materials are not stable because of the high reactivity of the isocyanate group in water. Thickening or gel formation is said to occur with increasing molecular weight within an interval of some minutes depending on the solid content of the solution.

For example, a solution of 4 percent of an isocyanate modified polyglycolether prepared from a polyglycolether of the molecular weight of 4,030, which is obtained by the addition of ethylene oxide to trimethylolpropane, produces a gelatinous mass. In another example an isocyanate modified polyglycolether containing 3.2 percent of NCO groups, was obtained from a polyglycolether based on the addition of ethylene oxide to trimethylolpropane and toluene diisocyanate. Upon stirring the product into water it solidified into an insoluble gel with the evolution of carbon dioxide which was perceived by the formation of bubbles in the gel, especially when large quantities of isocyanate are used. Windemuth discloses this gel-forming reaction as being adapted to the thickening of aqueous solutions or emulsions. Windemuth's reaction products of the polyglcolether and the isocyanate are summarized as being used for producing plasticizers, lubricants, plastics, spongy materials, gel formers, thickening agents, auxiliaries in textile industry and the like, with no teaching or suggestion of fire-retardant protective coatings.

In the Asao et al U.S. Pat. No. 3,719,050 a polyurethane prepolymer having terminal isocyanate groups is reacted with water in the soil to gel the polyurethane prepolymer and solidify the soil. The elatomer formed is said to have excellent strength and to strongly adhere to the soil to improve the soil properties.

The polyurethane prepolymer of Asao et al is synthesized from 2 to 8 moles of polyisocyanate per mole of a polyalkylene oxide compound. The alkylene oxides employed include ethylene oxide (EO), propylene oxide (PO), butylene oxide (BO), as well as styrene oxide and epichlorohydrin. In preferred embodiments the prepolymer is obtained as a reaction product of an ethylene oxide-propylene oxide copolymer having an ethylene oxide unit and propylene oxide unit in a ratio of from 90/10 to 70/30, which is reacted with an isocyanate compound having at least two isocyanate groups.

The polyurethane prepolymer is liquid or pasty at room temperature, and when added to 97 to 85 percent by weight of water, it readily dissolves, thereby forming a transparent solution, or is dispersed homogeneously therein to form an emulsion. The aqueous solution or emulsion is converted in a period of 20 seconds to two hours to a water-insoluble water-containing plastic material having a high elasticity. The polymerization of the urethane prepolymer by the cross-linking reaction with water produces carbon dioxide. Since the carbon dioxide gas produced is dissolved in the water present in the system, the resultant water-containing plastic material is a gel with a slight increase in volume owing to the gas formation.

The only utility of this polyurethane prepolymer is to form a gel when used as a soil-injecting agent. Inorganic materials such as clay, cement and the like can be mixed with the prepolymer and then injected into the soil. The elastomer which forms is said to have an extremely excellent strength and it markedly improves the soil in view of its strong adherence to the soil.

The harada et al U.S. Pat. No. 4,118,354 discloses a similar gel produced by dispersing a reaction product obtained by the reaction of a polyisocyanate having at least two isocyanate groups with a prepolymer. The polyether comprises a plurality of alkylene oxides, 50 to 90 percent by weight of which is ethylene oxide, added at random to a polyalcohol having at least two terminal hydroxyl groups. The alkylene oxides are added in an amount of an average molecular weight within the range of 1,000 to 4,000 per each hydroxyl terminal group of the polyalcohol.

The disclosed utility of these gels is in disposing of various sludges of the bottom of rivers, seas, and sludges removed from organic and inorganic waste liquids and sewage. The polyurethane hydrogels are also employed in disposing of liquid wastes released from breweries, papermills, dye works, tanneries, slaughter houses, etc. Further, aqueous solutions containing noxious metals and radioactive substances are said to be effectively confined within the polyurethane hydrogel to present them from being scattered.

In each of the Windemuth et al, Asao et al and Harada et al patent references, there is no discussion of modifying their gel compositions to obtain a fire-retardant gel.

Other types of polyurethanes have been used in combination with fire-retardant materials to form fire-retardant mixtures, especially in the production of fire-retardant polyurethane foams. The preferred polyurethanes disclosed in the patents, however, are based on polyisocyanate capped prepolymers having a relatively low molecular weight. As a result the terminal NCO groups on each have a relatively small amount of water-soluble polymer in between the NCO groups. The relatively large number of NCO groups per unit weight of the prepolymer renders the prepolymer more hydrophobic than is desired for the present gel invention. Furthermore, when the prepolymer is mixed with water, the large concentration of NCO groups react with water to generate a substantial amount of carbon dioxide ($CO_2$). Since these previous fire-retarding compositions are not based on prepolymer compositions which dissolve in water to form a solution prior to reaction, they do not form gels.

For example, the Murch et al U.S. Pat. No. 4,066,578 discloses polyurethane foams containing a synergistic combination of alumina hydrate with a phosphorous compound, and additionally discloses the use of a system of surfactants and suspending agent which makes the combination of alumina hydrate and the phosphorous compound more effective. U.S. Pat. No. 3,897,372 to Kehr et al discloses the use of flame-retardant additives such as melamines, borates, etc. in polyurethane foams.

OBJECTS OF THE INVENTION

It is an object of this invention to obtain a polyurethane coating composition that can be applied to a surface to provide fire resistance to the surface as well as protecting the surface from abrasion.

It is a further object to obtain a fire-retardant polyurethane gel composition that can be readily made by dissolving a prepolymer in an aqueous slurry containing a large amount of fire-retardant and/or intumescent materials.

It is a further object to obtain a fire-retardant polyurethane gel composition which is made from a polyurethane prepolymer having terminal NCO groups and being hydrophilic and capable of dissolving completely in an aqueous slurry.

These and other objects of the invention will become apparent as the description of this invention proceeds.

SUMMARY OF THE INVENTION

A fire-retardant protective coating which is useful for protecting or holding together surfaces vulnerable to fire, heat, air or minor abrasion is obtained by dissolving a special water-soluble polyisocyanate prepolymer in either an aqueous slurry or aqueous solution of fire-retardant materials or intumescent materials. Upon mixing the materials together a gel composition is obtained. This mixture can be applied as a coating and forms a gel of water held in a homogeneous network of a swollen, hydrophilic, cross-linked polyurethane with the fire-retardant and/or intumescent materials either alone or in combination uniformly dispersed throughout. Eventually the water evaporates, leaving a polyurethane coating with a large solids content.

The water-soluble polyisocyanate prepolymer can be made from a polyether polyol which contains enough oxyethylene units to make the prepolymer water soluble. In order to permit cross-linking of the final polymer coating, one embodiment employs a polyol which has more than two hydroxyl groups. Each of these hydroxyl groups can be capped with conventional diisocyanates such as toluene diisocyanate to yield the water-soluble polyisocyanate prepolymer. In another embodiment, the cross-linked final polymer structure can be obtained by selecting a diol, rather than a polyol, as the basic unit of the prepolymer with the isocyanate capping being done with a polyisocyanate having greater than two NCO groups per molecule.

The NCO groups on the prepolymer produce carbon dioxide when contacted with water. To insure that a gel is formed rather than a conventional polyurethane foam, the effective amount of NCO groups per prepolymer molecule must be reduced. This is done by utilizing relatively large polyol molecules between the terminal NCO groups. When the hydroxyl groups of a large polyol molecule are capped with the diisocyanate groups, for example, the number average molecular weight of the prepolymer obtained is about 2,000 or above. The prepolymer is employed in the range of 1 to 100 parts per 100 parts of water and preferably in the range of about 1–20 parts per 100 parts of water. The water phase also contains large quantities of the fire-retardant material. When smaller amounts of prepolymer are employed, there will not be enough resin to hold together the large amounts of additives. Larger amounts of prepolymer can be employed with the added benefit of greater strength.

DETAILED DESCRIPTION OF THE PREFERRED EMBODIMENTS

The prepolymer used in making the gels has a relatively large molecular weight with a relatively low amount of NCO per unit weight. Foams, on the other hand, have a much larger concentration of NCO groups per weight of the prepolymer. For example, the foams described in the Murch et al U.S. Pat. No. 4,066,578 have about two equivalents of NCO per 1000 grams of the prepolymer where one equivalent of NCO weighs 42 grams. This concentration can also be expressed as two milliequivalents of NCO per gram of prepolymer and written as 2 meq. NCO/g. The present gels have considerably less NCO groups on the order of about 1.0 meq. NCO/g or less. Thus there is a great deal more of the hydrophilic polymer between each terminal NCO group which by itself is hydrophobic. As a result the overall prepolymer is hydrophilic and dissolves completely in water.

One technique for making the low NCO concentration prepolymer is to chain extend a polyol with polyoxyalkylene units. Using the triol glycerol with the units of ethylene oxide and/or propylene oxide, for example, the following prepolymer forming polyol can be obtained.

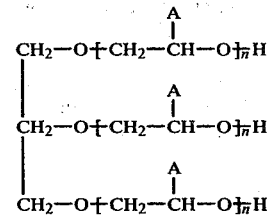

with the value of n being about 10 to 50 and where A can be H or $CH_3$. When A is H, the bracketed unit is an ethylene oxide (EO) unit and when A is $CH_3$, the unit is propylene oxide (PO). The amount of propylene oxide (PO) employed must be limited since the prepolymer will not have the necessary hydrophilicity if only PO is used. In the case where just PO and EO are used, the amount of PO to the total PO+EO should be less than about 50 percent so the prepolymer will dissolve in water. A further reason for this range is that when the PO content increases above 50 percent, the fire retardant ability of the resulting polymer diminishes.

This particular trifunctional polyol is then reacted with a diisocyanate to provide the urethane linkage and the terminal isocyanate groups as follows

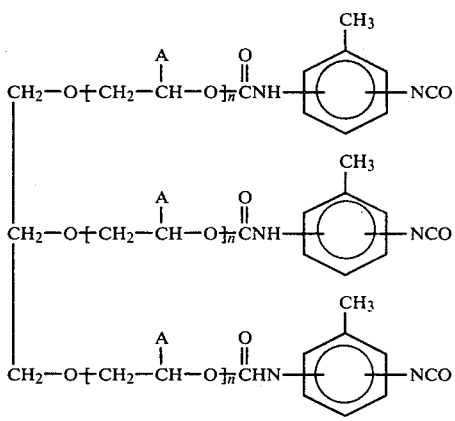

The selection of the polyoxyalkylene component depends on the conditions employed when the isocyanate capped prepolymer is subsequently dissolved in water to form the gel. A polyoxyalkylene made of just ethylene oxide units will be hydrophilic and dissolve in water, but it is a solid at room temperature. This can cause a problem during gel formation. While waiting for the last of the solid prepolymer to slowly dissolve in water, the part that has already dissolved may prematurely begin to form the gel, as will be explained later, so that a homogeneous gel is not obtained. To avoid this problem, it is advantageous to have the prepolymer in a liquid form so it can readily dissolve without heating, which increases the gelation rate, and mix with the water to form the gel. A prepolymer which is a liquid at room temperature can be obtained by incorporating various amounts of a relatively hydrophobic comonomer into the ethylene oxide based polymerization product. Comonomers such as propylene oxide (PO) described in the example above or butylene oxide (BO) may be copolymerized as a random copolymer, a block copolymer, or both, such that the resulting copolymer remains hydrophilic. Random copolymerization is especially preferred to insure obtaining a liquid prepolymer having a low viscosity.

The addition of these comonomers also provides other desirable features for certain applications, namely improved low temperature, flexibility, resiliency and the like. As discussed earlier, up to about 50 mole percent of a relatively hydrophobic comonomer such as propylene oxide may be copolymerized with the ethylene oxide monomer and still yield hydrophilic cross-linked network gels when those products are used as polyol intermediates in practicing the present invention. Preferred prepolymers have only up to about 30 mole percent of the relatively hydrophobic comonomer. Thus, throughout this text the term "polyoxyethylene polyol" is intended to include not only a homopolymer of ethylene oxide, but also hydrophilic copolymers of ethylene oxide such as those described above wherein all of the polyol derivatives have a hydroxyl functionality of about two or greater and an ethylene oxide content greater than about 50, and preferably greater than about 70 mole percent.

However, as indicated in the Asao et al U.S. Pat. No. 3,719,050 discussed earlier, larger amounts of alkylene oxides other than ethylene oxide might be employed to obtain a workable system involving an emulsion rather than a true solution.

The prepolymers do not have to be liquid. If the gel forming operation is carried out at an elevated temperature, then the prepolymer can be melted to the liquid state at that higher temperature. This liquid melt can then readily mix with the water to form the homogeneous gel. In addition, if the capping insocyanate is selected as one having a relatively low reactivity, then it may be acceptable to use a solid prepolymer and to wait for the solid to dissolve at room temperature because the gel forming reaction will not yet have begun.

Prepolymers can be made by reacting EO, PO or BO with polyols such as glycerol, 1,2,6-hexanetriol, 1,1,1,-trimethylolpropane,
3-(2-hydroxyethoxy)-1,2-propanediol,
3-(2-hydroxypropoxy)-1,2-propanediol,
2,4-dimethyl-2-(2-hydroxyethoxy)-methylpentanediol-1,5,
1,1,1-tris [(2-hydroxyethoxy) methyl]ethane,
1,1,1,-tris- [(2-hydroxypropoxy) methyl]propane,
triethanolamine, triisopropanolamine, pyrogallol and phloroglucinol.

One example of suitable commercially available chain-extended prepolymers is the polyether triol XD 1421 made by the Dow Chemical Company, which has a molecular weight of around 4900. It is composed of a ratio of three oxyethylene units randomly copolymerized per one unit of oxypropylene, and it has a hydroxy content of 0.61 meq. OH/g.

The chain extended polyol can then be capped with a polyisocyanate. Suitable polyisocyanates useful in preparing this type of prepolymer include toluene-2,4-diisocyanate, toluene-2,6-diisocyanate, commercial mixtures of toluene-2,4- and 2,6-diisocyanates, ethylene diisocyanate, ethylidene diisocyanate, propylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,6-hexamethylene diisocyanate, 1,4-tetramethylene diisocyanate, 1,10-decamethylene diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenlenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 4,4'-methylene bis (diphenylisocyanate), 4,4'-methylene bis(dicyclohexylisocyanate), isophorone diisocyanate, PAPI (a polyaryl polyisocyanate commercial product sold by the Upjohn Company as defined in U.S. Pat. No. 2,683,730), 1,4-anthracenediisocyanate, 2,5-fluorenediisocyanate, 1,8-naphthalenediisocyanate and 2,6-diisocyanatobenzfuran.

Also suitable are aliphatic polyisocyanates such as the triisocyanate Desmodur N-100 sold by Mobay which is a biuret adduct of hexamethylenediisocyanate; the diisocyanate Hylene W sold by du Pont, which is 4,4′-dicyclohexylmethane diisocyanate; the diisocyanate IPDI or Isophorone Diisocyanate sold by Thorson Chemical Corp., which is 3-isocyanatomethyl- 3,5,5-trimethylcyclohexyl isocyanate; or the diisocyanate THMDI sold by Verba-Chemie, which is a mixture of 2,2,4- and 2,4,4-isomers of trimethyl hexamethylene diisocyanate.

Another technique to produce the prepolymer is to use a polyfunctional isocyanate having a functionality greater than 2 in combination with a chain extended diol.

Suitable starting diols for chain extension useful in this method for preparing prepolymers include ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, resorcinol, hydroquinone, 4,6-di-tertiarybutyl catechol, and catechol.

Suitable polyisocyanates useful in this technique include PAPI (a polyaryl polyisocyanate commercial product sold by the Upjohn Compnay as defined in U.S. Pat. No. 2,683,730), 2,4,6-toluene-triisocyanate and 4,4′4″-triphenylmethane triisocyanate.

Other techniques to prepare the hydrophilic capped polyoxyethylene polyol reaction product having an average isocyanate functionality greater than two are disclosed in the Wood et al U.S. Pat. No. 4,137,200, incorporated herein by reference.

As discussed above, particularly useful gels may be prepared by first capping a polyoxyethylene polyol with a polyisocyanate such that the capped product has a reaction functionality greater than 2. Thereafter, the resin is reacted by dissolving it in water such that a crosslinked gel results.

It is also possible to use an isocyanate capped polyoxyethylene polyol having a functionality approximating 2, in which case a polyfunctional reactive member such as one having three or up to about eight reactive amine, hydroxy, thiol or carboxylate sites per average molecule is included to form a three dimensional crosslinked product. The reactive member preferably is one that is reactive enough to compete with the reaction of the water with the isocyanate groups. Useful polyfunctional reactive members are amines which include materials such as diethylenetriamine, triethylenetetramine, tetraethylenepentamine, polyethyleneimine, tolylene-2,4,6-triamine, ethylenediamine, trimethylenediamine, tetramethylenediamine, pentamethylenediamine, hexamethylenediamine, diethanolamine, triethanolamine, and the like.

To produce the gel the prepolymer is dissolved in water which also contains the fire-retardant and/or intumescent materials. Some of the terminal NCO groups react with water to form a carbamate compound which is unstable at room temperature and which breaks down to form an amine. The amine in turn reacts with another chain terminated NCO group to form a urea linkage to join the two chains. The reaction can be illustrated as follows:

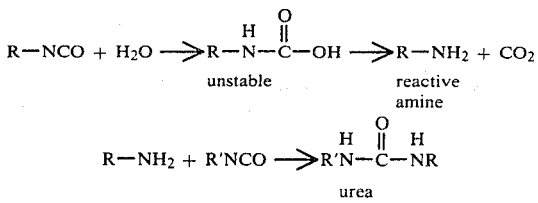

Various types of fire-retardants and/or intumescent materials can be incorporated into the gel. Most of the materials are first suspended or dissolved in the aqueous phase to form the slurry or solution and then the prepolymer is mixed with the slurry. The amount of materials to be added to the water can vary from about 10 parts of material per 100 parts of water up to about 300 parts of material per 100 parts of water. If concentrations are employed below the lower amount, there may not be enough fire retardant or intumescent material present in the resulting gel. On the other hand, if more material is added to the water than the upper specified amount, then a thick paste will form which will not mix well with the prepolymer. This discussion on the amount of additives is based on materials having a relatively low density such as a specific gravity of around 3, as possessed by alumina trihydrate. Of course, if much heavier particles are employed, such as lead, having a specific gravity of 11.3, then larger amounts by weight could be added to the aqueous slurry before a limiting thick paste is obtained. Some of the materials, such as the phosphates to be discussed below, can initially be mixed with the prepolymer instead of being added to the aqueous slurry or solution.

Broad classes of preferred materials include alumina trihydrate, Al (OH)$_3$; polyammonium phosphates; borates; borate derivatives of sugar, starch or cellulose, wood pulp, halogen containing materials, heavy metals; etc. H. Z. Vandersall describes many materials used in intumescent paint chemistry in *Journal of Fire and Flammability*, 2, 87 (1971). Vandersall lists four categories for classifying components of intumescent systems as (1) an inorganic acid or a material yielding acid at temperature between 100 and 250° C., (2) a polyhydric material rich in carbon, (3) an organic amine or amide, and (4) a halogenated material. Most formulations contain an example of each although, in some cases, two or more functional groupings are included in a single component.

Inorganic acid sources include acids such as phosphoric, sulfuric and boric; ammonium salts such as ammonium phosphate, ammonium monophosphate, ammonium diphosphate, ammonium polyphosphate, ammonium sulfate and ammonium halides; amine and amide phosphates such as urea phosphate, guanyl urea phosphate, melamine phosphate, polyphosphorylamide, phosphoryl trianilide, and reaction products of NH$_3$ and P$_4$O$_{10}$; amine sulfates such as p-nitroaniline bisulfate; and organophosphorus compounds such as tricresyl phosphate, alkyl phosphates; and haloalkyl phosphates such as tris(2,3 dibromopropyl)phosphate and tris($\beta$-chloroethyl)phosphate.

Polyhydric materials include starch; dextrin; sorbitol; pentaerythritol and its dimers and trimers; resorcinol; phenolics; triethylene glycol; methylol melamine; isano oil; and linseed oil.

Amine and amide compounds include urea, urea; HCHO, butyl urea, dicyandiamide, benzene sulfonylhydrazide, melamine, aminoacetic acid such as glycine, casein, polyamide resins and wool flock.

Halogenated compounds include chlorinated paraffins, chlorinated rubber, parachlorometaxylenol, tetrachlorophthalic resins and pentachlorophenyl glyceryl ether.

From about 20 to about 300 parts of alumina trihydrate are employed, and preferably from about 100 to about 275 parts per 100 parts of water. Satisfactory alumina trihydrate (also called hydrated alumina or alumina hydrate) is highly refined, inorganic white granular crystalline powder with the chemical formula of $Al_2O_3.3H_2O$, which is also frequently written as $Al(OH)_3$. Such material is produced by the Bayer process from bauxite ore and may contain small amounts of soda, iron oxide and silica. Suitable alumina trihydrates as described above are chemically inert and frequently are employed as inert fillers. Generally, the alumina trihydrate is employed in particulate form with an average particle size of from about 0.5 to about 120 microns. Particles of about 5 to about 20 microns are particularly useful.

The phosphorous-containing additive is employed at levels of from about 1 to about 40 parts by weight per 100 parts of water, and preferably at about 20 to about 30 parts. Suitable phosphorous-containing compounds include phosphites, polyphosphites, ammonium phosphates such as Phoschek P/30 made by Monsanto, polyphosphates, phosphate salts, organic phosphates, phosphonates and polyphosphonates and mixtures thereof. Additional phosphorous compounds are more fully described in U.S. Pat. No. 4,066,578, incorporated herein by reference.

Suitable carbon compounds include aliphatic alcohols having at least two hydroxyl groups per mole, and also include "aromatic" alcohols, i.e., phenols. Suitable aliphatic alcohols may be exemplified as follows: pentaerythritol, (mono-, di-, tripentaerythritol), methylene glycol, glycerine, polyvinyl alcohol, trimethylolpropane, erythritol, arabitol, triethanol amine and methylol melamine. Suitable saccharides include: starch, sorbitol, dextrin, flour, cellulose (including wood cellulose and its ground form, known as wood flour), mannitol, sucrose, inositol, and arabinose. Suitable phenols, (i.e., aromatic hydroxyl compounds) include: resorcinol, lignin, hydroquinol, trimethylolbenzene, pyrogallol, catechol and phloroglucinol. If undue thickening action occurs in the aqueous phase through use of any of the above carbon compounds, the amount of the compound employed should be reduced to permit adequate processing.

Suitable non-ionic surfactants/suspending agents, often described as solution thickeners, include but are not limited to non-ionic cellulosic polymers such as hydroxyethyl cellulose polymers (e.g., Natrosol, such as Natrosol 250 HH, by Hercules, or Cellosize by Union Carbide), hydroxypropyl cellulose (e.g., Klucel by Hercules), ethylhydroxyethyl cellulose (e.g., EHEC by Hercules), and ethyl cellulose. In addition to non-ionic cellulosic polymers, other appropriate non-ionic suspending agents include water-soluble polyoxyethylene polymers (e.g., Polyox by Union Carbide), gelatin, guar gum and agar.

Examples of suitable amphoteric and cationic surfactants are set forth in U.S. Pat. No. 4,066,578, which has been incorporated by reference into the present application. Suitable non-ionic surfactants include sorbitan trioleate (e.g., Arlacel 85 by ICI), polyoxyethylene sorbitol oleate (e.g., Atlas G 1186 by ICI), polyoxyethylene sorbitan monolaurate (e.g., Tween 21 by ICI), polyoxyethylene lauryl ether (e.g., Brij 30 by ICI), polyoxyethylene stearyl ether (e.g., Brij 72 by ICI), silicon glycol copolymer (Dow Corning 190), fluorochemical surfactants (e.g., Zonyl FSN by E. I. du Pont and Fluorad FC 170C by 3 M), condensates of ethylene oxide and propylene oxide with propylene glycol (e.g., Pluronic L62, Pluronic L64, Pluronic P75 by BASF Wyandotte), and organosilicone surfactants (e.g., L520 by Union Carbide).

In addition, reinforcing agents can also be added to the mixture to improve the strength of the resulting gel. Many types of fibers can be used for this purpose, such as wood, carbon, glass, polyolefin, polyester, polyamide, cellulosic and polyvinyl alcohol fibers; mineral wool; metal fibers; etc.

PREPARATION EXAMPLE 1

Seven hundred fifty grams of the polyether triol XD1421 made by Dow Chemical Company and composed of a ratio of three oxyethylene units randomly copolymerized per one oxypropylene to a molecular weight of around 4900 and having 0.61 meq. OH/g. was reacted at 70° C. for 16 hours with 85.3 g. of Type II toluene diisocyanate produced by Olin Chemical Co. This commercial grade of toluene diisocyanate is an 80/20 mixture made of 80 parts of 2,4-toluene diisocyanate and 20 parts of 2,6-toluene diisocyanate. The reaction product is a pale yellow liquid of 10,000 to 13,000 cps at 25° C. and it has 0.55 meq. NCO/g.

EXAMPLE 1

One gram of the prepolymer of Preparation Example 1 was mixed for 30 seconds with 25 g. of an aqueous fire-retardant slurry having the following composition:

|  | Pts/weight |
| --- | --- |
| Water | 100.0 |
| Al(OH)$_3$ | 130.0 |
| Phoschek P/30 | 20.0 |
| Wood pulp | 4.0 |
| Natrosol 250HH | 0.3 |
| Brij 72 | 0.5 |
| Pluronic L-64 | 1.0 |

The mixture was then smeared as a ⅛ inch thick coating onto a polished glass surface. Within one minute after mixing the mobile paste mixture gelled to a rubbery solid which adhered to the glass. After standing in air at 25° C. for 3 days, the rubbery solid had dried. No change in area was noted, and the dried solid still adhered well to the glass. This dried rubbery solid, when exposed to a match flame for 30 seconds and with the flame then removed, did not ignite. There was some surface char noted.

EXAMPLE 2

The composition prepared in Example 1 was cast as a liquid mixture onto a cardboard surface. The same flame test also showed no ignition of the coating.

EXAMPLE 3

A mixture was prepared using 2 g. of the prepolymer described in Preparation Example 1 and 25 g. of the aqueous fire-retardant slurry. The mixture was cast onto a sheet of cardboard and there was no ignition when using the match test as described in Example 1.

EXAMPLE 4

A mixture was prepared using 4 g. of the prepolymer of Preparation Example 1 and 25 g. of the aqueous fire-retardant slurry. The mixture was cast onto a sheet of cardboard and there was no ignition when the coating was subjected to the match flame test as described in Example 1.

What is claimed is:

1. A fire-retardant, elastomeric cross-linked polyurethane gel composition comprising the reaction product of
(a) a water-soluble prepolymer of a polyether polyol capped with polyisocyanates having a number average molecular weight of about at least 2,000, and
(b) an aqueous fire-retardant or intumescent slurry, said prepolymer being present in the reaction mixture in an amount of about 1 to 100 parts by weight per 100 parts of water.

2. A gel composition according to claim 1, wherein the prepolymer is a liquid at room temperature.

3. A gel composition according to claim 1, wherein the polyether polyol is made of random ethylene oxide units and other alkylene oxide units with the ethylene oxide units comprising at least about 50 percent of the total number of ethylene oxide and alkylene oxide units.

4. A gel composition according to claim 3, wherein the ethylene oxide units comprise at least about 70 percent of the total number of ethylene oxide and alkylene oxide units.

5. A gel composition according to claims 3 or 4, wherein the polyether polyol is made of random ethylene oxide units and propylene oxide units.

6. A gel composition according to claim 1, wherein said prepolymer is present in the reaction mixture in an amount of about 1 to 20 parts by weight per 100 parts of water.

7. A gel composition according to claim 1, wherein the slurry contains a fire-retardant or intumescent material present in an amount of about 10 to 300 parts per 100 parts of water.

8. A gel composition according to claim 1, wherein said slurry contains a fire-retardant or intumescent material selected from the group consisting of alumina trihydrate, polyammonium phosphates, borates, wood pulp, halogen-containing materials, heavy metals, phosphorous compounds, and mixtures thereof.

9. A gel composition according to claim 1, wherein the slurry further comprises a surfactant selected from the group consisting of amphoteric and cationic surfactants.

10. A gel composition according to claim 1, wherein the slurry further comprises a non-ionic surfactant suspending agent.

11. A gel composition according to claim 1, wherein the slurry further comprises a fiber reinforcing agent.

12. A gel composition according to claim 1, wherein the polyisocyanate capping the polyether polyol is toluene diisocyanate.

13. A gel composition according to claim 1, wherein the prepolymer has less than about 1.0 meq. NCO/g.

14. A gel composition according to claim 1, wherein the prepolymer has a number average molecular weight of at least 3,000.

15. A gel composition according to claim 1, wherein the slurry contains alumina trihydrate in an amount of about 20 to about 300 parts per 100 parts of water.

16. A gel composition according to claim 1, wherein
(a) the polyether polyol is a liquid made of random ethylene oxide units and propylene oxide units with the ethylene oxide units comprising at least about 70 percent of the total number of ethylene oxide and propylene units,
(b) the prepolymer is present in the reaction mixture in an amount of about 1 to 20 parts by weight per 100 parts of water, and
(c) the slurry contains a fire-retardant or intumescent, material in an amount of about 10 to 300 parts per 100 parts of water selected from the group consisting of alumina trihydrate, polyammonium phosphates, borates, wood pulp, halogen-containing materials, heavy metals, phosphorous compounds, and mixtures thereof.

17. A method of producing a fire-retardant, elastomeric cross-linked polyurethane gel by reacting together.
(a) a water-soluble prepolymer of a polyether polyol capped with polyisocyanates having a number average molecular weight of about at least 2,000, and
(b) an aqueous fire-retardant slurry, said prepolymer being present in the reaction in an amount of 1—100 parts by weight per 100 parts of water.

18. A method according to claim 17, wherein the polyether polyol is made of random ethylene oxide and propylene oxide units, with at least 70 percent of the total units being ethylene oxide and wherein the prepolymer is a liquid which is present in the reaction mixture in an amount of 1 to 20 parts per 100 parts of water.

19. A method of protecting flammable surfaces comprising applying to the surface of coating of a cross-linked polyurethane gel forming composition formed by reacting together.
(a) a water-soluble prepolymer of a polyether polyol capped with polyisocyanates having a number average molecular weight of about at least 2,000, and
(b) an aqueous fire-retardant slurry, said prepolymer being present in the reaction in an amount of 1—100 parts by weight per 100 parts of water.

20. A method according to claim 19, wherein the polyether polyol is made of random ethylene oxide and propylene oxide units with at least 70 percent of the total units being ethylene oxide and wherein the prepolymer is a liquid which is present in the reaction mixture in an amount of 1 to 20 parts per 100 parts of water.

21. In a fire-retardant, elastomeric cross-linked polyurethane gel composition comprising the reaction product of
(a) a water-soluble prepolymer of a polyether polyol capped with polyisocyanates having a number average molecular weight of about at least 2,000, and
(b) water, said prepolymer being present in the reaction mixture in an amount of about 1 to 100 parts by weight per 100 parts of water,
the improvement which comprises a combination of a fire-retardant or intumescent material present in an amount of about 10 to 300 parts per 100 parts of the water in the reaction mixture.

22. A gel composition according to claim 21, wherein the prepolymer is a liquid at room temperature.

23. A gel composition according to claim 21, wherein the polyether polyol is made of random ethylene oxide units and other alkylene oxide units with the ethylene oxide units comprising at least about 50 percent of the total number of ethylene oxide and alkylene oxide units.

24. A gel composition according to claim 21, wherein the ethylene oxide units comprise at least about 70 percent of the total number of ethylene oxide and alkylene oxide units.

25. A gel composition according to claims 23 or 24, wherein the polyether polyol is made of random ethylene oxide units and propylene oxide units.

26. A gel composition according to claim 21, wherein said prepolymer is present in the reaction mixture in an amount of about 1 to 20 parts by weight per 100 parts of water.

27. A gel composition according to claim 21, wherein said fire-retardant or intumescent material is selected from the group consisting of alumina trihydrate, polyammonium phosphates, borates, wood pulp, halogen-containing materials, heavy metals and phosphorous compounds, and mixtures thereof.

28. A gel composition according to claim 21, wherein the slurry further comprises a surfactant selected from the group consisting of amphoteric and cationic surfactants.

29. A gel composition according to claim 21, wherein the slurry further comprises a non-ionic surfactant suspending agent.

30. A gel composition according to claim 21, wherein the slurry further comprises a fiber reinforcing agent.

31. A gel composition according to claim 21, wherein the polyisocyanate capping the polyether polyol is toluene diisocyanate.

32. A gel composition according to claim 21, wherein the prepolymer has less than about 1.0 meq. NCO/g.

33. A gel composition according to claim 21, wherein the prepolymer has a number average molecular weight of at least 3,000.

34. A gel composition according to claim 21, wherein the slurry contains alumina trihydrate in an amount of about 20 to about 300 parts per 100 parts of water.

35. A gel composition according to claim 21, wherein
 (a) the polyether polyol is a liquid made of random ethylene oxide units and propylene oxide units with the ethylene oxide units comprising at least about 70 percent of the total number of ethylene oxide and propylene oxide units,
 (b) the prepolymer is present in the reaction mixture in an amount of about 1 to 20 parts by weight per 100 parts of water, and
 (c) the slurry contains a fire-retardant or intumescent material in an amount of about 10 to 300 parts per 100 parts of water selected from the group consisting of alumina trihydrate, polyammonium phosphates, borates, wood pulp, halogen-containing materials, heavy metals, phosphorous compounds, and mixtures thereof.

36. A gel composition according to claims 8, 16, 27 or 35, wherein said borates comprise sugar borate derivative, starch borate derivative, or cellulose borate derivative.

* * * * *